(12) United States Patent
Zatorski

(10) Patent No.: US 10,883,216 B2
(45) Date of Patent: Jan. 5, 2021

(54) DOMESTIC APPLIANCE FOR CLEANING A LOAD AND METHOD FOR CLEANING A LOAD IN A TREATMENT SPACE OF A DOMESTIC APPLIANCE

(71) Applicant: DIEHL AKO STIFTUNG & CO. KG, Wangen (DE)

(72) Inventor: Leszek Zatorski, Wroclaw (PL)

(73) Assignee: Diehl AKO Stiftung & Co. KG, Wangen (DE)

( * ) Notice: Subject to any disclaimer, the term of this patent is extended or adjusted under 35 U.S.C. 154(b) by 407 days.

(21) Appl. No.: 15/692,455

(22) Filed: Aug. 31, 2017

(65) Prior Publication Data

US 2018/0080165 A1    Mar. 22, 2018

(30) Foreign Application Priority Data

Sep. 16, 2016   (EP) .................................... 16002022

(51) Int. Cl.

| A47L 15/00 | (2006.01) |
|---|---|
| A47L 15/42 | (2006.01) |
| A47L 15/46 | (2006.01) |
| D06F 33/02 | (2006.01) |
| D06F 35/00 | (2006.01) |

(Continued)

(52) U.S. Cl.
CPC .......... *D06F 34/18* (2020.02); *A47L 15/0018* (2013.01); *A47L 15/4295* (2013.01); *A47L 15/46* (2013.01); *D06F 35/00* (2013.01); *D06F 39/14* (2013.01); *A47L 2401/04* (2013.01); *A47L 2401/20* (2013.01); *A47L 2501/28* (2013.01);

(Continued)

(58) Field of Classification Search
CPC .. A47L 15/0018; A47L 15/4295; A47L 15/46; A47L 2401/04; A47L 2401/20; A47L 2501/28; D06F 33/02; D06F 35/00; D06F 39/003; D06F 39/005; D06F 39/02; D06F 39/14; D06F 2202/10; D06F 2202/12; D06F 2220/00; G05B 11/01
USPC ........... 68/12.01, 12.02, 12.04, 12.18, 12.23, 68/12.26, 12.27, 17 R; 700/90
See application file for complete search history.

(56) References Cited

U.S. PATENT DOCUMENTS

| 9,927,777 B2 | 3/2018 | Boeldt et al. |
| 2013/0289753 A1 | 10/2013 | Boeldt et al. |
| 2015/0019017 A1* | 1/2015 | Bodine .................. D06F 39/14 700/275 |

FOREIGN PATENT DOCUMENTS

| CN | 101886319 A | 11/2010 |
| CN | 102953256 A | 3/2013 |

(Continued)

OTHER PUBLICATIONS

Bazzi et al., "DE19741023A1 English Machine Translation.pdf", Mar. 25, 1999—Machine translation from Espacenet.com.*

*Primary Examiner* — Levon J Shahinian
(74) *Attorney, Agent, or Firm* — Laurence A. Greenberg; Werner H. Stemer; Ralph E. Locher

(57) ABSTRACT

A domestic appliance for cleaning a load has a treatment space for accommodating a load to be cleaned, a load detecting device for detecting a load quantity in the treatment space, and a time detecting device for detecting a time value. A controller of the domestic appliance automatically starts a cleaning program when (i) the load quantity detected by the load detecting device exceeds a predetermined load limit value and (ii) the time value detected by the time detecting device exceeds a predetermined time limit value.

7 Claims, 1 Drawing Sheet

(51) Int. Cl.
*D06F 39/00* (2020.01)
*D06F 39/02* (2006.01)
*D06F 39/14* (2006.01)
*G05B 11/01* (2006.01)
*D06F 34/18* (2020.01)
*D06F 33/00* (2020.01)
*D06F 34/28* (2020.01)

(52) U.S. Cl.
CPC .............. *D06F 33/00* (2013.01); *D06F 34/28* (2020.02); *D06F 39/02* (2013.01); *G05B 11/01* (2013.01)

(56) References Cited

FOREIGN PATENT DOCUMENTS

| | | |
|---|---|---|
| CN | 103270664 A | 8/2013 |
| DE | 19741023 A1 | 3/1999 |
| DE | 10048081 A1 | 4/2002 |
| DE | 102004039435 B4 | 4/2013 |
| DE | 102012105340 A1 | 12/2013 |
| WO | 2012084663 A1 | 6/2012 |

* cited by examiner

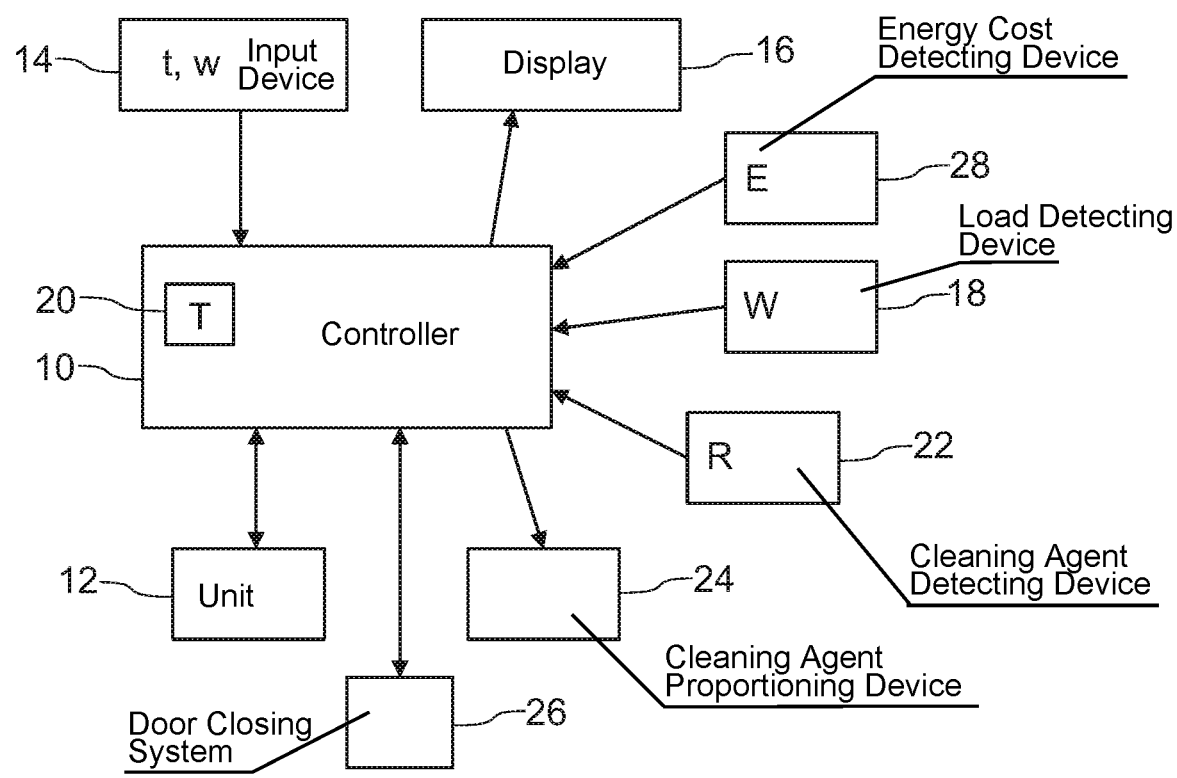

DOMESTIC APPLIANCE FOR CLEANING A LOAD AND METHOD FOR CLEANING A LOAD IN A TREATMENT SPACE OF A DOMESTIC APPLIANCE

CROSS-REFERENCE TO RELATED APPLICATION

This application claims the priority, under 35 U.S.C. § 119, of European application EP 16002022.8, filed Sep. 16, 2016; the prior application is herewith incorporated by reference in its entirety.

BACKGROUND OF THE INVENTION

Field of the Invention

The present invention relates to a domestic appliance for cleaning a load such as, for example, a rinsing machine or a laundry treatment device, and to a method for cleaning a load in a treatment space of a domestic appliance.

In domestic appliances for cleaning a load such as, for example, rinsing machines or laundry treatment devices (washing machines, laundry dryers etc.) it is known to adapt program sequences automatically to various parameters. Thus, for example, washing machines are known which detect a weight of a laundry load to be cleaned and automatically adapt a washing program sequence and/or an amount of washing agent to the detected quantity of load (compare e.g. published, non-prosecuted German patent application DE 197 41 023 A1). For rinsing machines, too, it is known to detect the quantity of load and the degree of soiling of the load in order to correspondingly adapt a rinsing program sequence (compare, e.g. published, non-prosecuted German patent application DE 100 48 081 A1).

In the case of such domestic appliances, it is also known to start cleaning programs automatically offset in time. This can be done, for example, in order to allow the cleaning program to start at a time at which the energy costs are lower, for example due to lower energy prices (compare, e.g. published, non-prosecuted German patent application DE 10 2012 105 340 A1) or at which operating noises of the domestic appliance are less disturbing (compare, e.g. published, non-prosecuted German patent application DE 10 2004 039 435 B4).

SUMMARY OF THE INVENTION

The invention is based on the object of providing an improved domestic appliance and an improved method for cleaning a load with an automatic programme start.

The object is achieved by the teaching of the independent claims. Particularly preferred embodiments and developments of the invention are the subject matter of the dependent claims.

The domestic appliance for cleaning a load has a treatment space for accommodating a load to be cleaned, a load detecting device for detecting a load quantity in the treatment space and a time detecting device for detecting a time value. According to the invention, the domestic appliance also has a controller which is configured for automatically starting a cleaning program when (i) the load quantity detected by the load detecting device exceeds a predetermined load limit value and (ii) the time value detected by the time detecting device exceeds a predetermined time limit value.

In the case of the domestic appliance according to the invention, a cleaning program can be started offset in time, but the cleaning program is only started when a minimum amount of load is reached. This makes it possible to avoid that the domestic appliance wastes energy, water, cleaning agent, etc. if the load is inadequate.

The domestic appliance for cleaning a load is preferably a rinsing machine, a laundry treatment device (washing machine, laundry dryer etc.) or the like.

The time value to be detected and the predetermined time limit value are preferably a time period or a clock time. The time detecting device is preferably a timer which is preferably integrated into the controller.

The amount of load to be detected and the predetermined load limit value are preferably a load weight, a load volume or the like. The load quantity detecting device has correspondingly preferably a weight sensor, a load detector (e.g. optical image acquisition system, sensor systems with electromagnetic waves, sensor systems with sound waves etc.).

In an advantageous embodiment of the invention, the domestic appliance also has an input device for inputting the predetermined time limit value by a user. This input device can preferably be the operating panel of the domestic appliance or be integrated in the latter. In other embodiments of the invention, the predetermined time limit value can also be permanently predetermined and, for example, stored in a memory of the controller.

In an advantageous embodiment of the invention, the domestic appliance also has an input device for inputting the predetermined load limit value by a user. This input device can be preferably the operating panel of the domestic appliance or be integrated in the latter. Preferably, the input device is configured for inputting the predetermined time limit value also for inputting the predetermined load limit value. In other embodiments of the invention, the predetermined load limit value can also be permanently predetermined and stored, for example, in a memory of the controller.

In a further advantageous embodiment of the invention, the domestic appliance also has a cleaning agent detecting device for detecting an available cleaning agent quantity. The controller of the domestic appliance is then preferably also configured to start the cleaning program automatically only when (iii) the cleaning agent quantity by the cleaning agent detecting device exceeds a predetermined cleaning agent limit value.

In a further advantageous embodiment of the invention, the domestic appliance also has an automatic door closing system for automatically closing a door to the treatment space. The controller of the domestic appliance is then preferably also configured to activate this automatic door closing system to close the door before it starts the cleaning program.

In a still further advantageous embodiment of the invention, the domestic appliance also has an energy cost detecting device for detecting actual energy costs. The controller of the domestic appliance is then preferably also configured to start the cleaning programme automatically only when (iv) the energy costs detected by the energy cost detecting device drop below a predetermined energy cost limit value. The actual energy costs are, for example, energy prices in various tariffs (e.g. day tariff, night tariff, weekend tariff etc.).

In a still further advantageous embodiment of the invention, the domestic appliance also has a display device for displaying at least one information item which is selected from the predetermined load limit value, the detected load quantity, a difference between the detected load quantity and the predetermined load limit value (e.g. difference, quotient), the predetermined time limit value, the detected time value and a difference between the detected time value and the predetermined time limit value (e.g. difference, quotient). This display device can preferably be the operating panel of the domestic appliance or be integrated in the latter. The display device is preferably combined with the input device. Additionally, the display device can preferably also display information with respect to the energy costs and the state of closure of the door to the treatment space.

The method for cleaning a load in a treatment space of a domestic appliance has the steps of detecting a load quantity in the treatment space and detecting a time value. The cleaning program is started automatically only when (i) the detected load quantity exceeds a predetermined load limit value and (ii) the detected time value exceeds a predetermined time limit value.

Particular advantages, definitions of terms, preferred embodiments correspond to those from the above description of the domestic appliance according to the invention and are, therefore, not repeated at this point.

The method preferably also has a step of inputting the predetermined load limit value and/or the predetermined time limit value by a user.

In an advantageous embodiment of the invention, furthermore, an available quantity of cleaning agent is detected. In this case, the cleaning programme is preferably started automatically only when (iii) the detected quantity of cleaning agent exceeds a predetermined cleaning agent limit value.

In an advantageous embodiment of the invention, the domestic appliance also has an automatic door closing system for automatically closing a door to the treatment space. In this case, the automatic door closing system is preferably activated for closing the door before the cleaning programme is started.

In an advantageous embodiment of the invention, at least one information item is also displayed to a user which is selected from the predetermined load limit value, the detected load quantity, a difference between the detected load quantity and the predetermined load limit value, the predetermined time limit value, the detected time value, and a difference between the detected time value and the predetermined time limit value.

In further ones of an advantageous embodiment of the invention, also actual energy costs are detected. In this case, the cleaning program is preferably started automatically only when (iv) the detected energy costs drop below a predetermined energy cost limit value.

Other features which are considered as characteristic for the invention are set forth in the appended claims.

Although the invention is illustrated and described herein as embodied in a domestic appliance for cleaning a load and method for cleaning a load in a treatment space of a domestic appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block diagram showing a construction of a domestic appliance according to an illustrative embodiment of the invention.

DETAILED DESCRIPTION OF THE INVENTION

Referring now to the single FIGURE of the drawing in detail, there is shown a domestic appliance for cleaning a load and is illustratively a rinsing machine or a washing machine.

The domestic appliance has a controller 10 which drives at least one unit 12 of the domestic appliance. The unit 12 is, for example, a water pump or a drive motor or a laundry drum.

The controller 10 is connected to an input device 14 and a display device 16. The input device 14 and the display device 16 are, for example, combined with one another and integrated in an operating plate of the domestic appliance.

The controller 10 is also connected to a load detecting device 18 which can detect a load quantity W to be cleaned in a treatment space of the domestic appliance. For this purpose, the load detecting device 18 has, for example, a weight sensor for detecting a weight of the load, a load detector (e.g. optical image acquisition system, sensor system with electromagnetic waves, sensor system with sound waves etc.) for detecting a volume of the load in the treatment space or the like.

The controller 10 also contains a timer as time detecting device 20. The time detecting device 20 is used for detecting a time value T. The time value T is, for example, a clock time or a time period.

In addition, the controller is optionally connected to a cleaning agent detecting device 22 and/or a cleaning agent proportioning device 24. On the one hand, the cleaning agent detecting device 22 can detect a quantity of cleaning agent R available in a cleaning agent storage space, on the other hand, the controller 10 can activate the cleaning agent proportioning device 24 to the proportioned supply of a cleaning agent.

Furthermore, the domestic appliance can have an automatic door closing system 26. The controller 10 can drive the automatic door closing system 26 in order to automatically close a door to the treatment space of the domestic appliance. On the other hand, the automatic door closing system 26 can inform the controller 10 of a current state of closure (open, closed) of this door.

Finally, the controller is optionally connected to an energy cost detecting device 28 for detecting actual energy costs E. The actual energy costs E are, for example, energy prices at various times of the day (e.g. day tariff, night tariff, weekend tariff, etc.) of the respective energy provider (e.g. power, water, etc.). The energy cost detecting device 28 can have, for example, a connection to the Internet in order to call up the current energy prices from the home page of the energy provider. Additionally or alternatively, the energy cost detecting device 28 can have a memory for storing the tariffs of the energy provider.

A time-displaced automatic starting of a cleaning program takes place as follows.

Via the input device 14, a user can input a required cleaning program for the load to be cleaned in the treatment space of the domestic appliance.

The user can input via the input device 14 a time limit value t (e.g. 20:00 hours, 2 hours, etc.) when the cleaning program is to be started at the earliest, and a load limit value w (e.g. 4 kg, 50%) from which quantity of load the cleaning program is allowed to be started. The input device 14 informs the controller 10 of the time limit value t input and the load limit value w input. These limit values t, w can be input once, for example, and stored in a memory of the controller 10 or input anew for each cleaning process.

The load detecting device 18 informs the controller 10 continuously or at regular time intervals of the detected quantity of load W.

The controller 10 starts the cleaning program selected by the user only when the two following conditions are met:
(i) the load quantity W detected by the load detecting device 18 is greater than the predetermined load limit value w input by the user (W>w), and
(ii) the time value T determined by the time detecting device 20 is greater than the predetermined time limit value t (T>t) input by the user.

In the case of a rinsing machine according to the invention, for example, the user does not need to think of switching it on in the evening. He only needs to input a required starting time once in the evening. If, however, hardly any dirty dishes have been placed into the rinsing machine in the course of the day, it will not start but waits, for example, until the next day. For example, in the case of insufficient loading of the rinsing machine, the cleaning program will not start in spite of the set time being reached so that water and electrical energy can be saved.

In this context, the load limit value w can be set to be variable by the user via the input device 14. Thus, the load limit weight, for example, can be set to be higher in the case of the rinsing machine being loaded with heavy pots, than when the rinsing machine is loaded with glasses or plastic dishes.

If present, the controller 10 activates the automatic door closing system 26, before starting the cleaning program, to close the door to the treatment space.

If present, the cleaning agent detecting device 22 informs the controller 10 of the detected quantity of cleaning agent R. The controller 10 starts the cleaning program selected by the user, in this case, only when the following condition is also met in addition to the two above conditions: (iii) the quantity of cleaning agent R detected by the cleaning agent detecting device 22 is greater than a predetermined limit value of cleaning agent.

Furthermore, the energy cost detecting device 28, if present, informs the controller 10 of the actual energy costs E. In this case, the controller 10 starts the cleaning program selected by the user only when the following condition is also met in addition to the above conditions: (iv) the energy costs E detected by the energy cost detecting device 28 are lower than a predetermined energy cost limit value.

Via the display device 16, especially the following information can be displayed to the user:
selected cleaning program;
status of the current cleaning program;
the predetermined/input time limit value t, the detected time value T and/or a difference between the predetermined time limit value t and the detected time value T (e.g. as difference, e.g. "still 1.5 hours");
the predetermined/input load limit value w, the detected load quantity W and/or a difference between the predetermined load limit value w and the detected load quantity W (e.g. as quotient, e.g. "50% of the load limit");
the detected quantity of cleaning agent R, a difference between the predetermined cleaning agent limit value and the detected cleaning agent quantity R and/or a status assessment (e.g. "sufficient"); and
the detected energy costs E and/or a status assessment (e.g. "sufficiently favourable").

The following is a summary list of reference numerals and the corresponding structure used in the above description of the invention:
10 Controller
12 Unit
14 Input device
16 Display device
18 Load detecting device
20 Time detecting device
22 Cleaning agent detecting device
24 Cleaning agent proportioning device
26 Automatic door closing system
28 Energy cost detecting device
E Detected energy costs
R Detected quantity of cleaning agent
t Time limit value
T Detected time value
w Load limit value
W Detected load quantity

The invention claimed is:

1. A domestic appliance for cleaning a load, the domestic appliance comprising:
a treatment space for accommodating the load to be cleaned;
a load detecting device for detecting a load quantity in said treatment space;
a time detecting device for detecting a time value;
a controller configured for automatically starting a cleaning program when:
the load quantity detected by said load detecting device exceeds a predetermined load limit value; and
the time value detected by said time detecting device exceeds a predetermined time limit value.

2. The domestic appliance according to claim 1, further comprising an input device for inputting the predetermined time limit value by a user.

3. The domestic appliance according to claim 1, further comprising an input device for inputting the predetermined load limit value by a user.

4. The domestic appliance according to claim 1,
further comprising a cleaning agent detecting device for detecting an available cleaning agent quantity; and
wherein said controller is configured to start the cleaning program automatically only when the available cleaning agent quantity detected by said cleaning agent detecting device exceeds a predetermined cleaning agent limit value.

5. The domestic appliance according to claim 1,
further comprising a door for said treatment space;
further comprising an automatic door closing system for automatically closing said door to said treatment space; and
wherein said controller is configured to activate said automatic door closing system to close said door before said controller starts the cleaning program.

6. The domestic appliance according to claim 1, further comprising a display device for displaying at least one information item which is selected from the group consisting of the predetermined load limit value, the load quantity, a difference between the load quantity and the predetermined load limit value, the predetermined time limit value, the time value and a difference between the time value and the predetermined time limit value.

7. The domestic appliance according to claim 1,
further comprising an energy cost detecting device for detecting actual energy costs; and
wherein said controller is configured to start the cleaning program automatically only when the actual energy costs detected by said energy cost detecting device drop below a predetermined energy cost limit value.

\* \* \* \* \*